Dec. 13, 1966   G. E. BORN ETAL   3,291,589
APPARATUS FOR SEALING HOLLOW GLASS PARTS
Filed Jan. 9, 1963   3 Sheets-Sheet 1
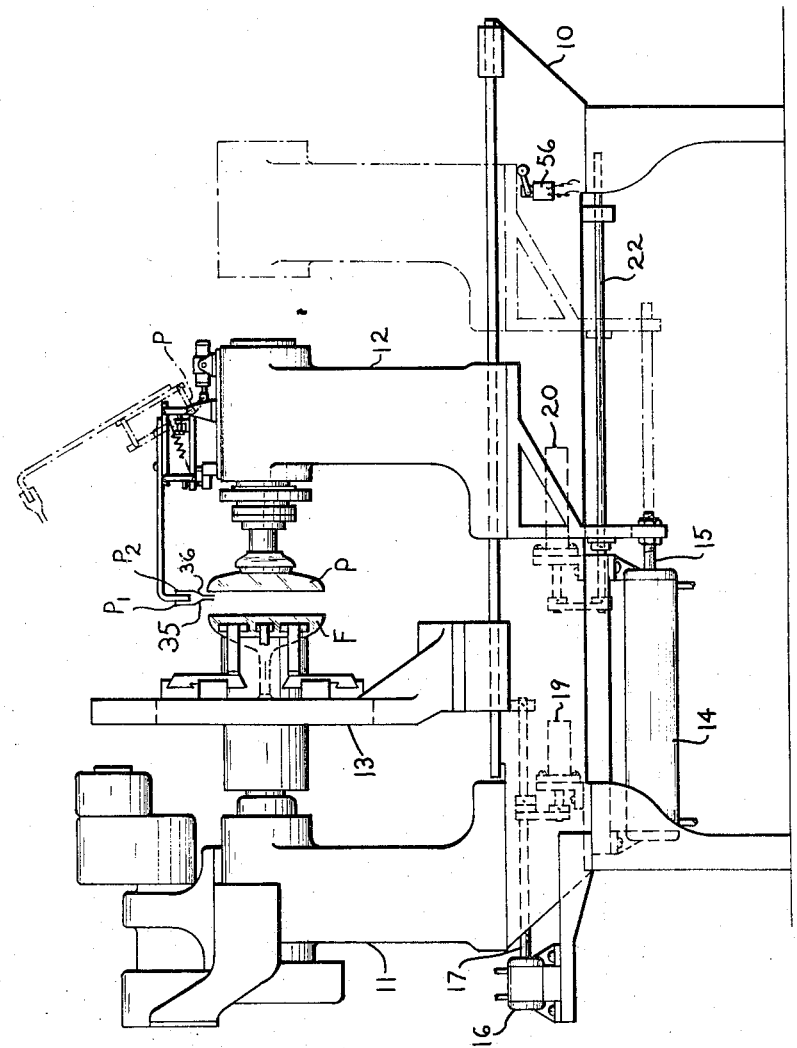
INVENTORS
GEORGE BORN
BY HELMUT H. GUTHEIL
GEORGE PAINTER
ATTORNEYS

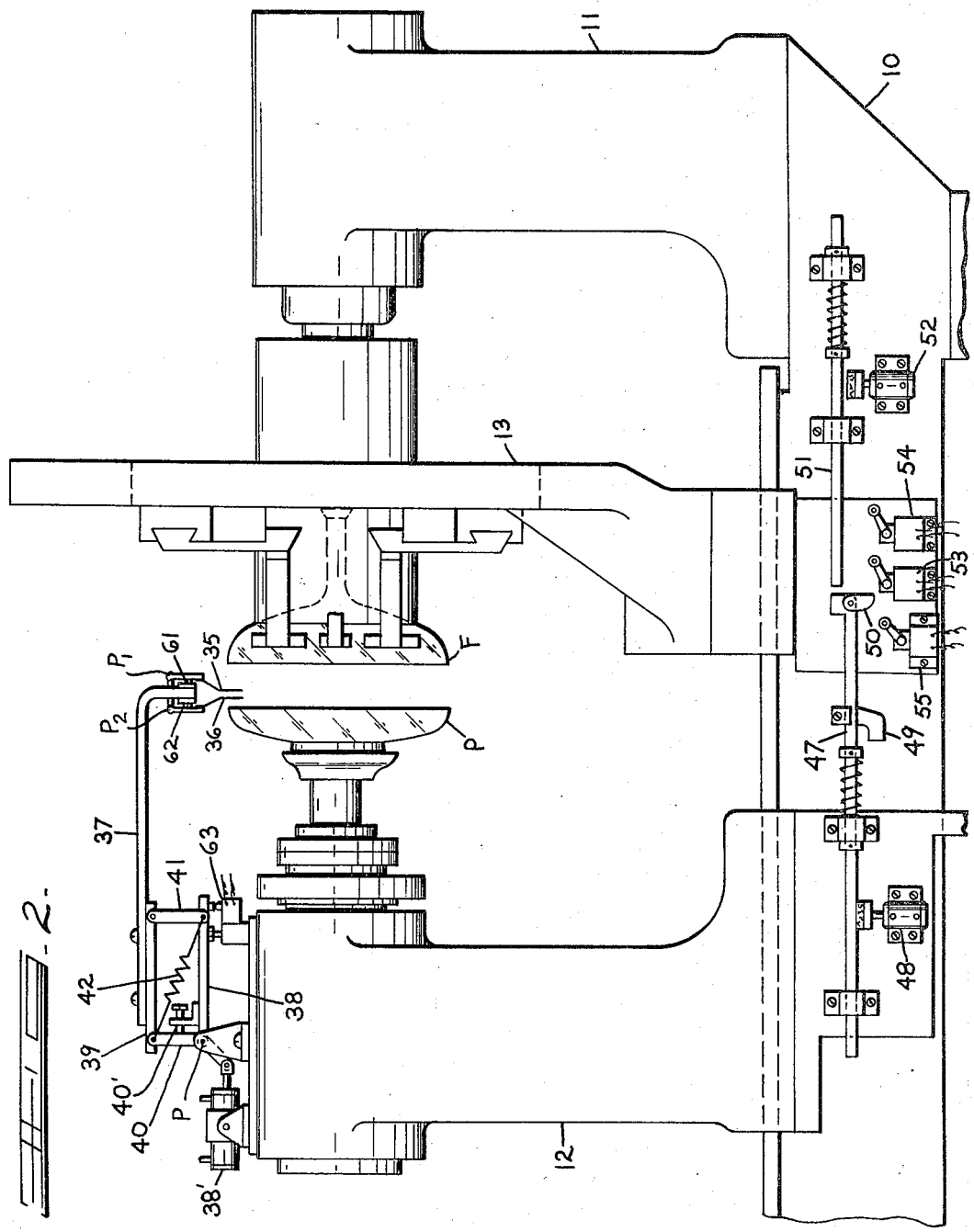

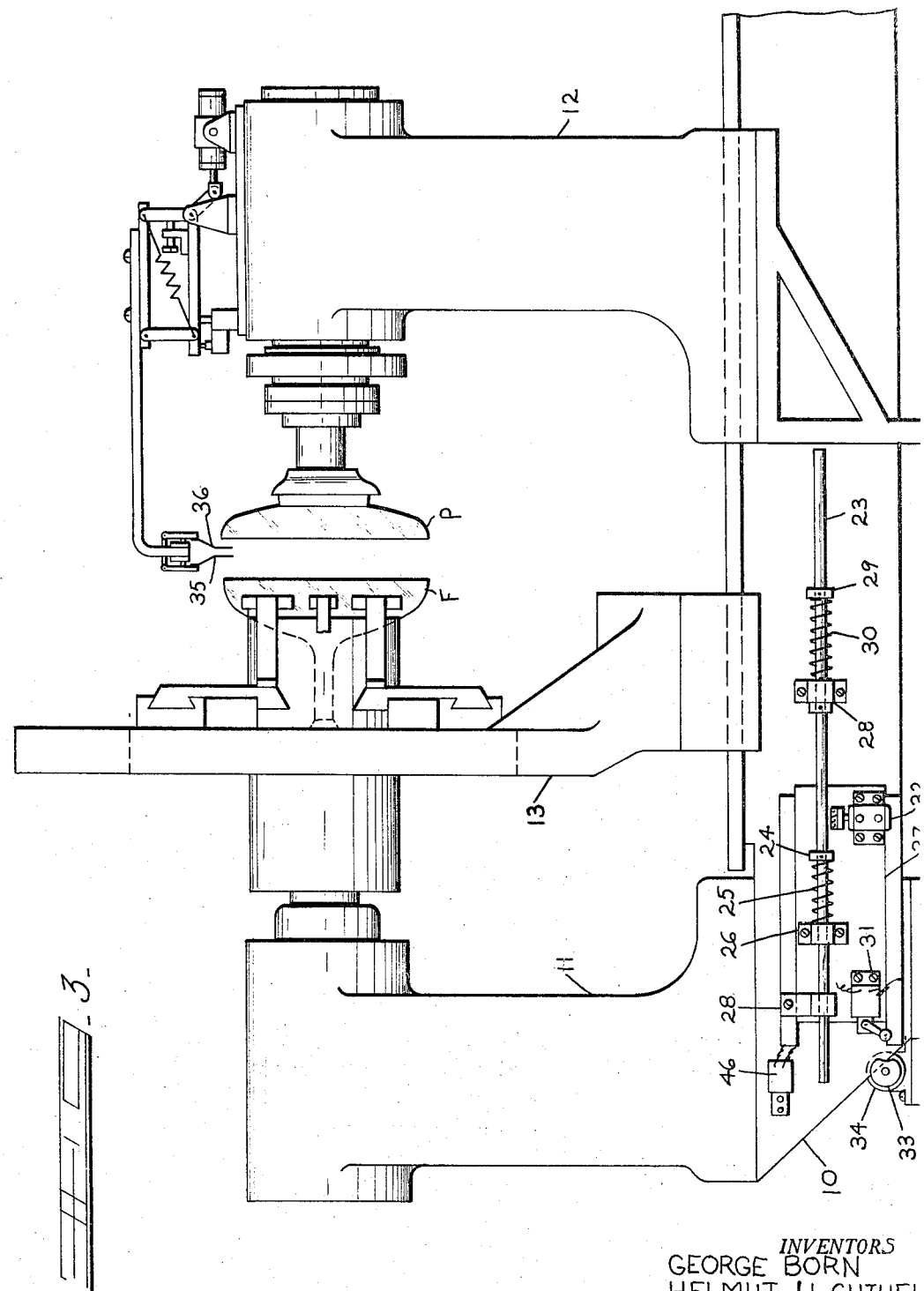

United States Patent Office 3,291,589
Patented Dec. 13, 1966

3,291,589
APPARATUS FOR SEALING HOLLOW
GLASS PARTS
George E. Born, Columbus, Helmut H. Gutheil, Toledo, and George Painter, Columbus, Ohio, assignors to Owens-Illinois Inc., a corporation of Ohio
Filed Jan. 9, 1963, Ser. No. 250,361
15 Claims. (Cl. 65—152)

This invention relates to the sealing of hollow glass articles and particularly to the sealing of hollow glass parts to form a cathode ray tube bulb.

Glass cathode ray tube bulbs are conventionally formed by mounting the glass funnel and face plate in the head stock and tail stock, respectively, of a lathe and manipulating the two glass parts while applying heat with gas burners and electrodes to form the completed tube. The lathe is manipulated by an operator and, as a result, it is extremely difficult to obtain reproducible results and extensive experience and training of the operator is necessary.

It is an object of this invention to provide a novel method and apparatus for sealing hollow glass parts and particularly the parts of a cathode ray tube bulb.

It is a further object of the invention to provide such a method and apparatus wherein a seal is produced between the glass parts which is strong and of high quality.

It is a further object of the invention to provide such a method and apparatus which will accommodate for variations in length of the glass parts.

Basically, the invention comprises moving the glass parts toward one another and sensing the positions of the edges of the parts. The resultant sensing of the positions of the parts is used as a reference point for initiating a cycle of further movements of the parts and the burners relative to one another.

In the drawings:

FIG. 1 is a partly diagrammatic side elevational view of an apparatus embodying the invention.

FIG. 2 is a partly diagrammatic side elevational view of the apparatus taken from the other side.

FIG. 3 is a partly diagrammatic view similar to FIG. 1 showing the relationship of certain other parts of the apparatus.

Referring to FIG. 1, the apparatus comprises a lathe including a base 10 and a head stock 11. A tail stock 12 is slidably mounted on the base 10 as is a burner carriage 13 that supports burners which are positioned adjacent the periphery of the glass parts to be joined.

A glass funnel F is supported in the chuck on the head stock 11 and a glass face plate P is supported in the chuck on the tail stock 12. The parts F and P are adapted to be rotated in synchronism at appropriate times in the sealing cycle.

The tail stock 12 is moved toward and away from the head stock 11 by an air cylinder 14 fixed on base 10 and connected to the tail stock 12 by a rod 15. The burner carriage 13 is moved slidably on the base 10 by an air cylinder 16 on the base 10 connected to the burner carriage 13 by a rod 17. A hydraulic control unit 19 connected to rod 17 by a suitable linkage controls the final movement of the burner carriage 13 toward the head stock 11. Similarly, a hydraulic speed control unit 20 controls the final movement of the tail stock 12 toward the head stock 11 through a rod 22.

As shown in FIG. 3, a rod 23 is engaged by the tail stock 12 and movable therewith, the rod being guided along the base by fixed guides 28. A spring 30, telescoped on the rod 23 and extending between a guide 28 and stop 29 on the rod 23, yieldingly urges the rod 23 toward the right, as shown in FIG. 3, away from the head stock 11. The rod 23 is yieldingly connected to a slide 27 on base 10 by an arrangement which includes a stop 24 on the rod that acts on a spring 25 telescoped on the rod which, in turn, acts on a projection 26 on the slide 27. A micro-switch 31 is fixed on the slide 27. Thus, as the tail stock 12 is moved toward the left, as shown in FIG. 3, the slide is moved toward the left positioning the micro-switch 31. An air cylinder 32 mounted on the slide 27 is provided with an actuator to lock the slide 27 in position on the rod 23. Thereafter, subsequent movement of the tail stock 12 moves the rod 23 and the slide 27 as a unit against the yielding action connection of the spring 30 keeping micro-switch 31 in contact with a periphery of a rotatable cam 33 that is rotated by a timer 34. When the cam surface of cam 33 engages micro-switch 31, a dump valve 46 is activated to stop the movement of tail stock 12. As the cam 33 rotates, the micro-switch is deactivated to start the movement of tail stock 12. The tail stock 12 then moves toward the head stock 11 until the micro-switch is again activated. The tail stock thus moves in increments. Cam 33 makes about a ¾ revolution to control one complete sealing cycle and is returned to starting position when tail stock 12 is returned to the load position.

As shown in FIG. 2, a pair of sensing fingers 35 and 36 are mounted on the downwardly projecting extremity of an arm 37 pivoted to the tail stock at the point $p$. The sensing fingers 35, 36 are adapted to be swung vertically into and out of position between the parts F and P by an air cylinder 38'. Arm 37 includes two horizontally arranged plates 38 and 39 which are pivotally joined by two upright members 40 and 41 to form a parallelogram. A spring 42 interconnects diametrically opposed pivot points of the parallelogram to hold member 40 against a stop 40' on plate 38 and permit its floating movement away from the head stock 12.

Finger 35 is pivotally mounted on the downwardly projecting extremity of arm 37 at pivot point $p_1$. Finger 35 is spring loaded so that as finger 35 is brought into contact with the edge of funnel part F it operates a limit switch 61 on arm 37. The tail stock 12 may be moved further toward the head stock 11 without adversely affecting finger 35 since arm 37 can float away from the tail stock 12. Finger 36 is pivotally mounted on arm 37 in juxtaposed relation to finger 35 and is pivotally mounted at point $p_2$ such that when the edge of part P engages the finger 36 by movement of finger 36 toward the edge, a limit switch 62 on arm 37 is energized.

In operation, the glass parts P and F are loaded in the head stock 11 and tail stock 12 and air cylinder 38' is actuated to lower fingers 35 and 36 vertically downwardly between the edges of the parts. A switch 63 is operated by base plate 38 of the sensing assembly when the fingers are swung downwardly to actuate air cylinder 14 (FIG. 1) and air locking cylinder 48 (FIG. 2). When air cylinder 14 is operated, it moves the tail stock 12 and fingers 35, 36 toward the head stock 11 with fingers 35 and 36 interposed between the aligned edges of the parts. A horizontally floating bar 47 slidably mounted on the tail stock 12 is locked in position by operation of air locking cylinder 48. As the tail stock 12 is moved from left to right, as shown in FIG. 2, bar 47 moves with the tail stock in locked relation.

When the tail stock 12 carrying bar 47 in locked relation moves from left to right, as shown in FIG. 2, toward the head stock 11, it contacts a bar 51 slidably mounted on base 10 by supports 51a and moves it from left to right. When sensing finger 35 contacts the funnel assembly edge, limit switch 61 is energized to lock floating bar 51 on the lathe bed by operation of a lock cylinder 52 on base 10. At this point, the position of bar 51 has been established with reference to the funnel edge position. After bar 51 is locked in position, bar 47 is unlocked by release of lock cylinder 48 and allowed to float relative to tail stock 12 against the end of locked bar 51. As tail stock 12 continues to move toward head stock 11, finger 36 when contacted by the face plate edge operates limit switch 62. This actuates lock cylinder 48 and locks floating bar 47 in fixed position. At this point, the bar 47 is at a point corresponding to the edge of face plate P which, in turn, is at a predetermined distance from the funnel edge. At the same time, locking cylinder 32 (FIG. 3) is operated to lock slide rod 23 in position holding micro-switch 31 against cam 33. Also, bar 51 is unlocked and allowed to float remaining unlocked throughout the remainder of the cycle. The micro-switch 62 also starts timer 34 (FIG. 3) which rotates the cam 33 and also actuates cylinder 38' to withdraw the fingers 35, 36.

The continued movement of the cam 33 controls the opening and closing of switch 31 which, in turn, controls dump valve 46 for actuating the cylinder 14 which moves the tail stock 12. The timer also at the appropriate time ignites the burners on the burner carriage 13 and energizes the electrodes thereon.

Bar 47 has a trip plate 50 mounted on its extremity which contacts switch 53 to slow down the forward movement of the tail stock as it approaches the funnel edge. As bar 47 continues its movement, it trips a switch 54. Switch 54 serves to actuate air cylinder 16 to move the burner carriage 13 toward the tail stock 12. A cam 49 mounted on rod 47 controls movement of the burner carriage 13 by contacting a switch 55. The contoured surface of cam 49 serves to control the movement of the burner carriage 13 in proper relation to the parts as they are moved together. As the tail stock moves, cam 49 moves off of switch 55 and cylinder 16 is actuated to move burner carriage 13 until cam 49 again engages switch 55. Thus, the burner carriage 13 moves in increments to follow the incremental movement of the tail stock 12. A switch 56 on base 10 is actuated by tail stock 12 to cushion its movement on retraction of the tail stock 12.

It can thus be seen that there has been provided an arrangement wherein the sensing of the edges of the glass parts initiates a cycle of operations which has been previously established. The cycle is not begun until the edges of the glass parts are in predetermined relation to one another.

We claim:

1. An apparatus for sealing two hollow glass parts having complementary sealing edges which are positioned in longitudinal alignment which comprises
    means holding a first part in fixed position,
    means for moving a second part toward the first part,
    means for sensing the position of the sealing edge of the first part as the second part is moved toward the first part,
    means for sensing the position of the complementary sealing edge of the second part as it approaches the first part,
    means responsive to the sensing of the sealing edge of said second part to initiate the rotation of said first and second parts,
    and apply flame heat to the complementary sealing edges of the parts as the parts are rotating,
    means responsive to the sensing of the sealing edges of said second part to move the second part toward the first part as the heat is being applied and while the parts are rotating,
    and means responsive to said movement of said second part to move said flame axially with said second part.

2. An apparatus for sealing two hollow glass parts having complementary sealing edges which are positioned in longitudinal alignment which comprises
    a base,
    a head stock on said base for rotatably supporting a first part,
    a tail stock mounted on said base for movement toward and away from said head stock and rotatably supporting a second part,
    means for moving the tail stock toward and away from the head stock,
    a first sensing member movably mounted on said tail stock for interposition between said parts for contacting said first part,
    a second sensing member movably mounted on said tail stock for interposition between said parts for contact by said second part,
    a first floating bar movably mounted on said tail stock,
    means for locking said first floating bar against movement relative to said tail stock,
    a second floating bar movably mounted on said base,
    means for locking said second floating bar against movement relative to said base,
    means responsive to the engagement of said first sensing member with the sealing edge of said first part to unlock said first floating bar and lock said second floating bar,
    means responsive to the contact of said second sensing member with the sealing edge of said second part to lock said first floating bar and unlock said second floating bar,
    a slide bar slidably mounted on said base,
    means responsive to the engagement of said second sensing member with the sealing edge of said second part to lock said slide bar against movement,
    a switch associated with said slide bar,
    a cam against which said switch is moved by said slide bar,
    means operatively connecting said switch to said means for moving said tail stock,
    and means associated with said first floating bar for controlling the movement of the tail stock toward the head stock.

3. The combination set forth in claim 2 including a burner carriage slidably mounted on said base between said head stock and tail stock,
    means for moving said burner carriage,
    and means actuated by said first floating bar as it moves in unison with said tail stock to control the operation of said means for moving said burner carriage.

4. The combination set forth in claim 2 including means for moving the sensing members into and out of operative position.

5. The combination set forth in claim 4 including means responsive to the movement of said sensing members into operative position to operate said means for locking said first floating bar.

6. In an apparatus for sealing together the complementary sealing edges of two hollow complementary glass parts, the combination comprising.
    means for supporting each said glass part for synchronous rotation and relative movement toward the other glass part,
    a sensing unit for sensing the relative positions of the sealing edges of the two glass parts when they are moved toward one another,
    and a control unit conditioned by actuation of said sensing unit for controlling the further movement of the parts toward one another in a predetermined cycle after the sensing unit has determined the relative positions of the sealing edges.

7. The combination set forth in claim 6 wherein said sensing unit comprises a first sensing element mounted for movement with one of the parts toward the other of the parts,
    a second sensing element mounted for movement with said one part toward the other part and for movement relative to said first sensing element, said first and second sensing elements being movable in unison relative to said one glass part, said first sensing element being positioned to engage the sealing edge of the other part, said second sensing element being positioned to engage the sealing edge of the one part, means for supporting said sensing elements for movement into and out of alignment with the sealing edges of the parts, and means responsive to the relative movement between the sensing elements for establishing a cycle for controlling the further movement of the parts toward one another.

8. The combination set forth in claim 7 wherein said means responsive to relative movement between said sensing elements comprises a first switch actuated by said first sensing element, a second switch actuated by said second sensing element, means selectively positioned by energization of said first switch, and means selectively positioned by energization of said second switch, thereby establishing the relative positions of said two sensing elements, said selectively positioned means controlling said means for moving said parts relative to one another.

9. In an apparatus for sealing together the complementary edges of two hollow complementary glass parts, the combination comprising means for supporting each said part for rotation and relative movement toward the other part, a sensing unit for sensing the relative positions of the edges of the two parts when they are moved toward one another, and a control unit conditioned by said sensing unit for controlling the further movement of the parts toward one another in a predetermined cycle after the sensing unit has determined the relative positions of the sealing edges, said control unit comprising a member movable with said first means, control means selectively positioned in response to movement of said one part, and lock means actuated by engagement of said sensing unit with the sealing edge of the one part for locking said control means in relative position to said one part, and means controllable by the position of said control means to control the movement of said one part toward the other in a predetermined cycle.

10. In an apparatus for sealing together the complementary edges of two hollow complementary glass parts, the combination comprising means for supporting one said part for rotation and relative movement toward the other part, means for supporting the other part for rotation in synchronism with said one part, piston means for moving said one part toward and away from the other part, a sensing unit for sensing the relative positions of the edges of the two articles when they are moved toward one another, and a control unit conditioned by said sensing unit for controlling the further movement of the parts toward one another in a predetermined cycle after the sensing unit has determined the relative positions of the sealing edges, said sensing unit comprising a first finger, a second finger, means for supporting said first and second fingers for movement in unison with one of said parts toward the other of said parts and for relative movement with respect to each other, a first control device fixed with relation to said first finger and actuated by relative movement therebetween, a second control device fixed with relation to the second finger and controlled by relative movement between the first finger and the second finger, whereby said first control device is actuated when the first finger engages the edge of the other part and the second finger is actuated when the second finger engages the edge of the one part, said control unit comprising a first member movable with said one part, control means selectively positioned in response to movement of said first member, and lock means actuated by engagement of said second finger with the sealing edge of the one part for locking said control means in relative position to said one part, and means controllable by the position of said control means to control the piston means which movement moves the one glass part relative to the other glass part.

11. In an apparatus for sealing together the complementary edges of two hollow complementary glass parts, the combination comprising means for supporting each said part for rotation and relative movement toward the other part, a sensing unit for sensing the relative positions of the sealing edges of the two parts when they are moved toward one another, and a control unit conditioned by said sensing unit for controlling the further movement of the parts toward one another in a predetermined cycle after the sensing unit has determined the relative positions of the sealing edges, said sensing unit comprising a mounting bracket, a first finger, a second finger, means for supporting said first and second fingers in axially spaced relation on said mounting bracket for movement in unison relative to one of said parts and in unison with said one part toward the other of said parts and for relative movement with respect to each other, a first control device fixed on said mounting bracket with relation to said first finger and actuated by relative movement therebetween, a second control device fixed on said mounting bracket with relation to the second finger and controlled by relative movement between the first finger and the second finger, whereby said first control device is actuated when the first finger engages the sealing edge of the other part and the second control device is actuated when the second finger engages the sealing edge of the one part.

12. In an apparatus for sealing together the complementary edges of two hollow complementary glass parts, the combination comprising means for supporting each said part for rotation and relative movement toward the other part, a carriage supporting means for heating the edges of said glass parts, a sensing unit for sensing the relative positions of the sealing edges of the two parts when they are moved toward one another, said sensing unit comprising a pair of axially spaced fingers mounted for movement in unison with and in unison relative to a first glass part and also relative to one another, and a control unit conditioned by said sensing unit for controlling the further movement of the parts toward one another in a predetermined cycle after the sensing unit has determined the relative positions of the sealing edges, said control unit comprising a first member movable with said first glass part, a second member movable with said carriage, first control means adapted to be selectively positioned in response to movement of said first member, second control means adapted to be selectively positioned in response to movement of said second member, first lock means actuated by engagement of said first sensing finger to lock said first control means in selected position corresponding to the sealing edge of the second glass part, and second lock means actuated by engagement of said second sensing finger with the sealing edge of the second part for locking said second control means in relative position to said second part, and means controllable by the position of said first and second control means to control the movement of said glass parts and said carriage in a predetermined cycle.

13. In an apparatus for sealing together the complementary edges of two hollow complementary glass parts, the combination comprising means for supporting each said part for rotation and relative movement toward the other part, a carriage supporting means for heating the edges of said glass parts, a sensing unit for sensing the relative positions of the sealing edges of the two parts when they are moved toward one another, and a control unit conditioned by said sensing unit for controlling the further movement of the parts toward one another after the sensing unit has determined the relative positions of the sealing edges, said sensing unit comprising a first finger, a second finger, means for supporting said first and second fingers for movement in unison relative to and also in unison with one of said parts toward the other of said parts and for relative movement with respect to each other, a first control device fixed with relation to the second and actuated by relative movement therebetween, a second control device fixed with relation to the second finger and controlled by relative movement between the first finger and the second finger, whereby said first control device is actuated when the first finger engages the edge of the other part and the second finger is actuated when the second finger engages the edge of the one part, said control unit comprising a first member movable with said one part, a second member movable with said carriage, first control means selectively positioned in response to movement of said first member, second control means selectively positioned in response to movement of said second movement, first lock means actuated by engagement of said first sensing finger to lock said first control means in selected position corresponding to the sealing edge of the one part, and second lock means actuated by engagement of said second finger with the sealing edge of the one part for locking said second control means in relative position to said other part, and means controllable by the position of said first and second control means to control the movement of said parts and said carriage.

14. In an apparatus for sealing together the complementary edges of two hollow complementary glass parts, the combination comprising a base, means on said base for supporting each said part for rotation and relaive movement toward the other part, a carriage movably mounted on said base, a sensing unit mounted on said base for movement with one part for sensing the relative positions of the edges of the two parts when they are moved toward one another, said sensing unit comprising a pair of fingers mounted for movement in unison with and in unison relative to a first part and also relative to one another, and a control unit on said base conditioned by said sensing unit for controlling the further movement of the parts toward one another in a predetermined cycle after the sensing unit has determined the relative positions of the sealing edges, said control unit comprising a first member movable with said one part, a second member movable with said carriage, first control means slidable on said base and selectively positioned in response to movement of said first member, second control means slidable on said base and selectively positioned in response to movement of said second member, first lock means on said base actuated by engagement of said first sensing finger to lock said first control means in selected position corresponding to the sealing edge of the other part, and second lock means actuated by engagement of said second finger with the sealing edge of the one part to lock said second control means in relative position to said one part, and means controllable by the position of said first and second control means to control the movement of said parts and said burner carriage.

15. In an apparatus for sealing together the complementary edges of two hollow complementary glass parts, the combination comprising means for supporting one said part for rotation and relative movement toward the other part, means for supporting the other part for rotation in synchronism with said one part, piston means for moving said one part toward and away from the other part, a carriage supporting means for heating the edges of said glass parts, piston means for moving said carriage, a sensing unit for sensing the relative positions of the edges of the two glass parts when they are moved toward one another, said sensing unit comprising a pair of fingers mounted for movement in unison with and in unison relative to a first glass part and also relative to one another, and a control unit conditioned by said sensing unit for controlling the further movement of the glass parts toward one another in a predetermined cycle after the sensing unit has determined the relative positions of the sealing edges, said sensing unit comprising a first finger, a second finger, means for supporting said first and second fingers for movement in unison with one of said glass parts toward the other of said glass parts and for relative movement with respect to each other, a first control device fixed with relation to said first finger and actuated by relative movement therebetween, a second control device fixed with relation to the second finger and controlled by relative movement between the first finger and the second finger, whereby said first control device is actuated when the first finger engages the edge of the other part and the second control device is actuated when the second finger engages the edge of the one part, said control unit comprising a first member movable with said first means, a second member movable with said carriage, first control means selectively positioned in response to movement of said first member, second control means selectively positioned in response to movement of said second member, first lock means actuated by engagement of said first sensing finger to lock said first control means in selected position corresponding to the sealing edge of the other part, second lock means actuated by engagement of said second finger with the sealing edge of the one part for locking said second control means in relative position to said one part, and means controllable by the position of said first and second control means to control the piston means for moving said one part and said carriage, respectively.

References Cited by the Examiner

UNITED STATES PATENTS 2,101,673  12/1937  Neuman _____ 65—160
2,452,652  11/1948  Hansen _____ 65—29

DONALL H. SYLVESTER, *Primary Examiner.*

J. H. NEWSOME, *Assistant Examiner.*